Sheet 1- 3 Sheets.
A. A. Tentler,
Ladies' Garment Pattern,
Nº 1,944.
Patented Jan. 23, 1841.
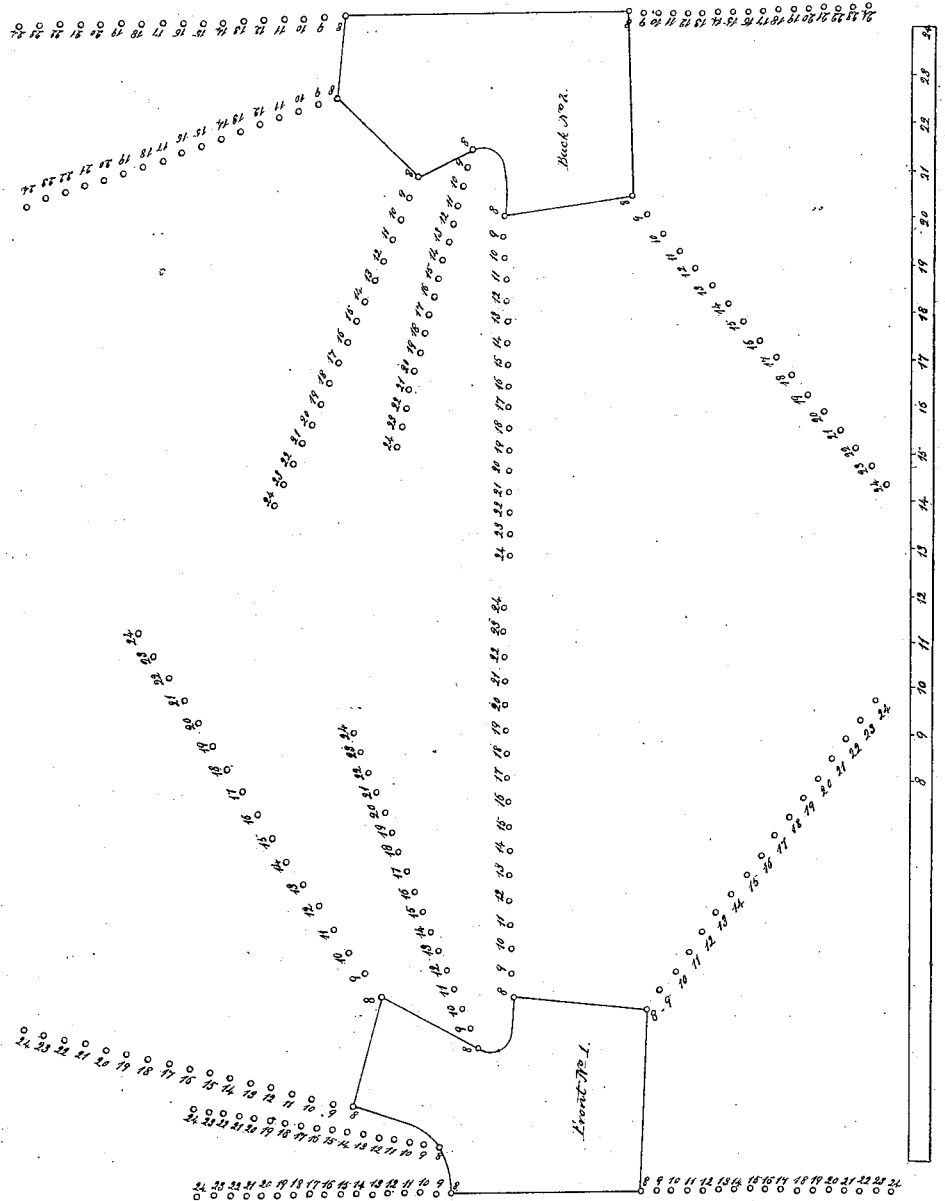

Sheet 2. 3 Sheets
A. A. Tentler,
Ladies' Garment Pattern,
No. 1,944. Patented Jan. 23, 1841.
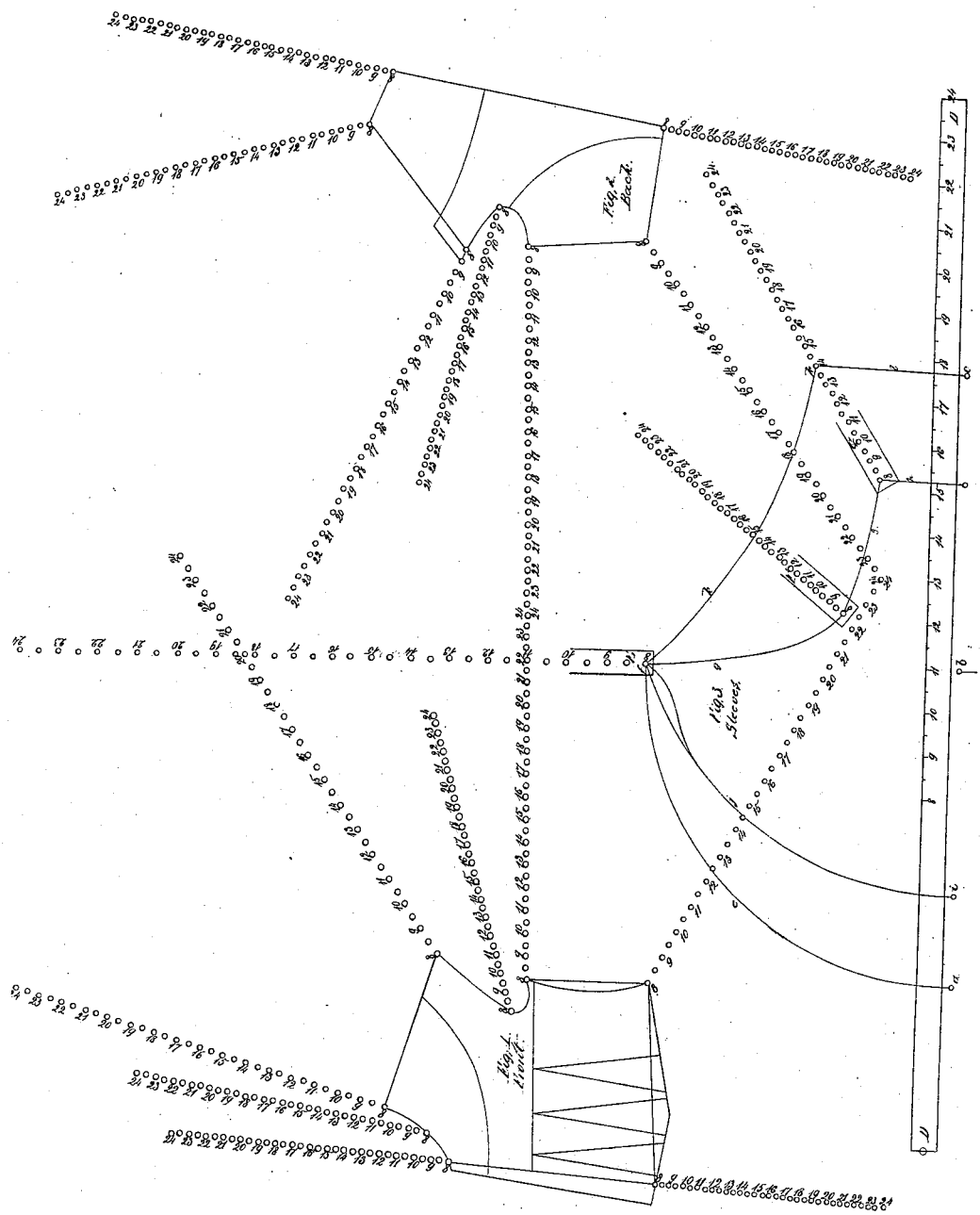

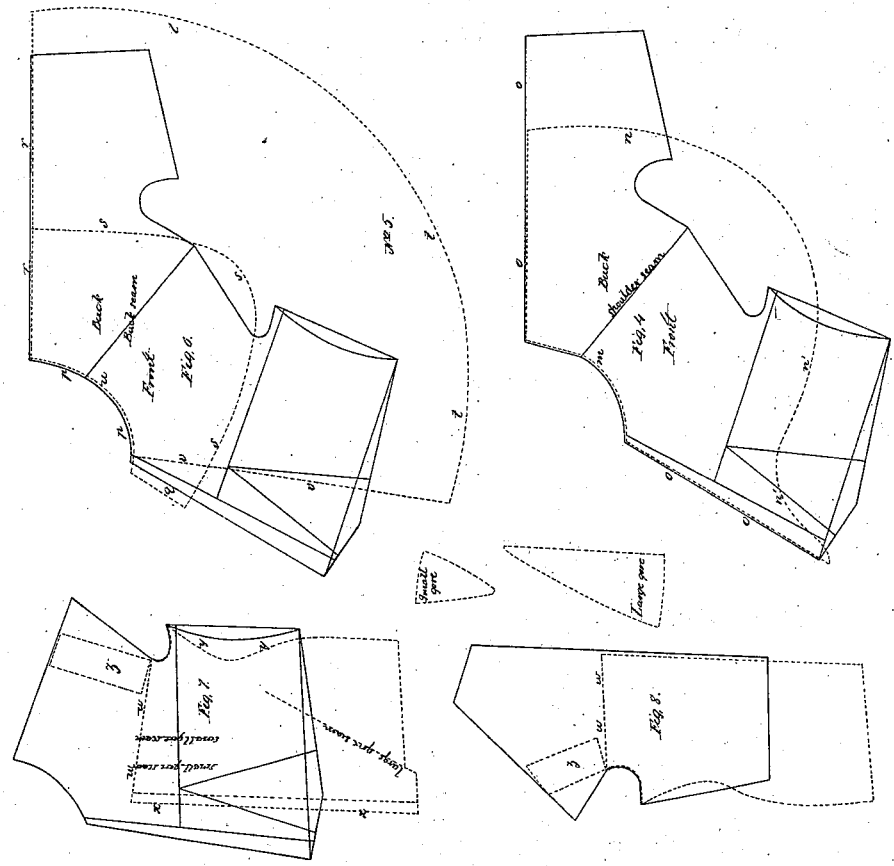

UNITED STATES PATENT OFFICE.

AARON A. TENTLER, OF PHILADELPHIA, PENNSYLVANIA.

MANNER OF TAKING MEASURES AND DRAFTINGS FOR THE CUTTING OUT OF LADIES' DRESSES, INCLUDING HABITS, CLOAKS, AND OTHER SIMILAR ARTICLES.

Specification of Letters Patent No. 1,944, dated January 23, 1841.

*To all whom it may concern:*

Be it known that I, AARON A. TENTLER, of the city of Philadelphia, in the State of Pennsylvania, have invented certain improvements in the manner of taking measures and draftings for the cutting out of ladies' dresses, including habits, cloaks, corsets, and other articles of a like character; and I do hereby declare that the following is a full and exact description thereof.

The general principle, or plan, of the scale by which I make my drafts, is not of my invention, or discovery, but I have greatly improved and extended the same, so as not only to render it correct in its results, but also to make it applicable to a number of cases, or purposes, to which it could not be applied in its original form.

The accompanying drafting scale, on the sheet marked A, is that upon which I have founded my improved system of drafting, and this, as above stated, is not of my invention, but, so far as I know, represents all that has been attempted in this way prior to the invention of my improvements; these improvements are represented on the sheets marked B, and C, and these I will employ in giving the description of my system, by which I shall be enabled to point out the nature of improvements.

Figure 1, on Sheet B, is the foundation of the scale for the front of a lady's habit, or other dress, and Fig. 2, is a similar foundation for the back.

In obtaining the measure, to bring these scales into use the measurement is first to be taken around the body of the person to be fitted, immediately under the arms and over the breast; and this is done by means of a strip of paper, or any other suitable article, and the measure so taken is to be halved by doubling the strip over; the length thus obtained becomes the gage from which the drafting is to be effected. D, D, on Sheet B, is the scale by which the measure is to be applied to use; this scale is divided into inches and half inches, and is numbered up from 8 inches, which is assumed as the smallest length of the half girth of the body; to the scale of this assumed size, the front and back, Figs. 1 and 2, are drawn; were the person of this size, that is to say, 16 inches in girth under the arms, the draft on the cloth would be made the same with that of the outlines of these figures, and this would be effected by placing the sheet on the cloth to be cut, and making a mark with chalk through each of the perforations 8, 8, on the extremes of these figures, from which marks, the required lines would then be drawn. But, suppose the half measure of the girth of the body to be 18 inches, instead of 8, the Sheet B, is in like manner to be placed upon the cloth, and a mark, or dot, made through each of the punctures, or perforations, in the respective lines of holes extending from Figs. 1, and 2; these punctures, or holes, being in such direction, so graduated in size in each of the lines as to correspond with the inches and half inches upon the scale D, D, and so as to increase the size in each part in its due proportion. The points for drafting will thus be obtained for this, or any other, number contained on the scale D, D.

In the Sheet A, the same general system is employed, but the respective lines of punctures are incorrectly laid down, so that garments cut by them would be far from fitting; and, besides this, the foundation forms given in Figs. 1, and 2, are themselves incorrect, the lines of the upper and lower portions being made square with the back seam, and being equally incorrect on the front. By the aid of extensive observation and practice I have rendered these correct.

I have given this explanation for the purpose of showing what was known prior to my improvements, and in order that the extent and limit of my claims may be thereby rendered apparent.

Fig. 3, on Sheet B, shows my scale for drafting sleeves, in which I have applied the lines of perforations, or punctures, to this part of the dress, which has not heretofore been done, this part having been cut without any fixed rule.

In drafting for the sleeve, the Sheet B, is to be laid down on the proper part of the cloth, and a dot is to be made upon it though each of the punctures *a*, *b*, and *c*; the place of the middle puncture *b*, should have a line, like *d*, made below it, to distinguish this point, as it becomes a center, or guide, in the operation of drafting; a line is then to be drawn through these points. The measure of the length of the arm, the measure around the wrist, and the measure of the person around the body, used in Nos. 1, and 2, are employed in drafting the sleeve. The lines

*a, e, f, g, h,* shows the outline of a sleeve, harmonizing in size with the front and back, as shown in outline in Nos. 1, and 2. In preparing to draft the sleeve, a point is to be made with chalk through the respective lines of punctures E, F, and G, where the numbers correspond with that of the half measurement around the body, as taken for use and employed in the former examples. The curve *a, e, f,* for the head of the sleeve, is then to be struck by means of the half girth measure, a center being made on the line *a, b, c,* sometimes on the point *b,* and sometimes either above or below it. When the arm is small, this center should be about two fingers' breadth above, or to the left of, the point *b;* for a short and fat arm it may, on the contrary, be three or four fingers' breadth below this point, the judgment of the cutter necessarily governing in this particular; the curved line *g, g,* is to be of the length of the sleeve, and is to be drawn by hand from the dot on the line E, through those on the lines F, and G. This line may be extended beyond H, to any point indicated by the required length of the arm, which is ascertained by laying the length measure around the curve. The lines *i, j, k, l,* are the outlines of a sleeve for a person whose arm is short and thick. The head of such a sleeve, I have said may be struck from a center three or four fingers' breath below the point *b,* which would bring this line in from *a,* to *i;* and the line *b,* which is is the line of the wrist, must be carried down to a corresponding distance, and made of the necessary length for the width of the sleeve. The curve *k, k,* is then to be struck by hand, and must be of the length of the arm measure, and this curve, for a large arm, approaching nearer to a straight line than that for a small arm, its length must be proportionately increased.

In the foregoing remarks on the sleeve, I have spoken only of the sleeve as corresponding with the starting number of the scale, 8, but they are to be understood as applying to the number 18, or to any other number, indicated by the half girth.

For cutting the collar, or cape of a dress, after joining the front and back of the dress at the shoulder seam, they are laid flat on the cutting board, as shown in Fig. 4; a point is then made at the middle of the neck part, as at *m,* which serves as a center for marking out the collar, or cape; the upper part of the collar, or cape, is cut to the curve at *m,* and from this as a center point, a circle is struck which is represented by the dotted lines *n, n',* which circle may be larger, or smaller, according to the desired size of the collar, or cape. At the part *n', n',* the collar, or cape, may be trimmed off, or cut, according to the prevailing fashion, or to fancy; the sides of the collar, or cape, are to coincide with the lines *o, o,* on the front and back. This part, previously to my invention, had always been cut without any other guide than the judgment, or skill, of the cutter.

In Fig. 6, I have represented the manner in which I cut the part generally denominated the yoke, and also the cape for a cloak, and this I do on the same general principle on which I cut the collar, or cape, as in the last described figure. The yoke is to be cut at the neck part, as at *p, p,* to the same curve with that formed by the union of the front and back, and it is to coincide at the front *q,* and at the back seam *r,* with the line of those parts, but it is to be cut about an inch wider, as shown by the extension of the dotted lines at *q,* in order to allow for its lying over those parts, when on the person; the curved part *s, s,* need not be cut by rule, but will be governed by fancy, or judgment, in the individual case.

The cape, which is numbered 5, on Fig. 6, represented by the dotted lines *t, t, t,* is to be struck on a circle from the middle point of the neck, as at *u;* at the back it coincides with the line *r, r,* but at the front it is cut off, as at the line *v, v,* to a greater or less distance, depending on the fullness with which it is desired to hang by the wearer; were it not so cut off, it would lap over in front, and be inconvenient. The rule of cutting these parts, above laid down, although simple, has not heretofore been known.

In cutting corsets, I take for my guide, as a foundation, the draft of the dress, as shown in Fig. 4, and I have in Fig. 7, represented the front, and in Fig. 8, the back of the dress, in red lines, showing the manner in which I make these the foundation for drafting the front and back of the corset, which are shown on the same figures in black lines. The parts of the corset are, necessarily, less in the girth than the dress under which it is to be worn, and it must also be cut away in the upper and front parts, where the dress, but not the corset, is intended to cover the person. Hitherto, corsets have been cut from patterns, without any fixed rule, I being the first to apply the dress measure as a guide in this particular.

The lines for the front of the dress, Fig. 7, having been laid down, according to the rules hereinbefore given, the material out of which the corset is to be cut is laid upon it, and a line *w, w,* is drawn for the top of the corset; the line *x, x,* which is that of the side seam, is laid off at such distance from the corresponding line of the dress as the judgment may dictate. For a person who is thin the reduction in size will be small; for one who is full the reduction must be greater. The line *y, y,* which is the front, is to be curved, or hollowed, in like manner, according to the fullness of the person; the piece marked z, is the shoulder strap, in which, and in the gores, there is not anything to be observed, they being the same as in other corsets.

In Fig. 8, the relationship of the black lines showing the corset back, to the red lines showing that of the dress, will be perfectly apparent from the remarks made respecting the front, the top line of this part, is marked w, w, and the shoulder strap z, as in No. 7.

Having thus, fully described the manner in which I proceed in taking the measure for dresses for ladies, and the application of said measure to the drafting thereof, preparatory to cutting; and having also shown, as I believe, all that there had been done upon the same principle, prior to my improvements thereon, what I claim as constituting these improvements, and desire to secure by Letters Patent, are the following particulars:

1. I claim the applying of the measure of the half girth of the body, taken in the manner herein pointed out, to the drafting of the sleeve, by the aid of the lines of punctures, or perforations, E, F, and G, laid down on the foundation, Fig. 3, of the accompanying drafts, in the manner, or upon the principle, herein made known.

2. I claim the manner of drafting for the cutting of capes, yokes and collars, by using the fronts and backs, obtained and employed in the manner set forth, as a guide in striking the curves thereof, and in determining the outlines of their front and back edges, as set forth.

In testimony whereof I have hereunto set my hand this eighteenth day of June, in the year one thousand, eight hundred and forty.

AARON A. TENTLER.

Witnesses:
 THOS. P. JONES,
 B. K. MORSELL.